US009853936B2

(12) United States Patent
Reistad

(10) Patent No.: US 9,853,936 B2
(45) Date of Patent: Dec. 26, 2017

(54) METHOD AND SYSTEM FOR MESSAGE PACING

(71) Applicant: Open Text SA ULC, Halifax, CA (US)

(72) Inventor: Brian Reistad, Redmond, WA (US)

(73) Assignee: Open Text SA ULC, Halifax, CA (US)

( * ) Notice: Subject to any disclaimer, the term of this patent is extended or adjusted under 35 U.S.C. 154(b) by 0 days.

(21) Appl. No.: 15/205,739

(22) Filed: Jul. 8, 2016

(65) Prior Publication Data

US 2016/0323212 A1 Nov. 3, 2016

Related U.S. Application Data

(63) Continuation of application No. 14/325,313, filed on Jul. 7, 2014, now Pat. No. 9,419,934, which is a continuation of application No. 13/745,192, filed on Jan. 18, 2013, now Pat. No. 8,805,945, which is a continuation of application No. 13/564,532, filed on
(Continued)

(51) Int. Cl.
| | |
|---|---|
| *G06F 15/16* | (2006.01) |
| *H04L 12/58* | (2006.01) |
| *G06Q 30/02* | (2012.01) |
| *G06Q 10/06* | (2012.01) |
| *G06F 3/0484* | (2013.01) |

(52) U.S. Cl.
CPC ....... *H04L 51/32* (2013.01); *G06Q 10/06316* (2013.01); *G06Q 30/02* (2013.01); *G06Q 30/0201* (2013.01); *G06Q 30/0235* (2013.01); *G06Q 30/0239* (2013.01); *G06Q 30/0241* (2013.01); *G06Q 30/0255* (2013.01); *G06Q 30/0271* (2013.01); *H04L 51/04* (2013.01); *H04L 51/22* (2013.01); *G06F 3/04847* (2013.01)

(58) Field of Classification Search
CPC ......... H04L 51/32; H04L 51/04; G06Q 30/02; G06Q 30/021; G06Q 30/0235; G06Q 30/0239; G06Q 30/0241
USPC .......................................................... 709/206
See application file for complete search history.

(56) References Cited

U.S. PATENT DOCUMENTS 4,625,081 A * 11/1986 Lotito ............... H04M 3/53316
  379/196
5,073,142 A * 12/1991 Kasai ................... A22C 15/001
  452/46
(Continued)

FOREIGN PATENT DOCUMENTS

| EP | 0371607 A2 | 6/1990 |
| EP | 0371607 A3 | 6/1990 |
(Continued)

OTHER PUBLICATIONS

International Search Report for PCT/US01/21403, dated Nov. 10, 2003, 7 pages.
(Continued)

*Primary Examiner* — Frantz Jean
(74) *Attorney, Agent, or Firm* — Sprinkle IP Law Group

(57) ABSTRACT

A system for managing message volume and timing, which permits first and second messages to be spaced apart over time, with the pacing controlled in part by a characteristic of the second message. The system sends the first message to an intended recipient. The system determines a separation based on a pacing algorithm and sends the second message to the recipient according to the separation.

20 Claims, 7 Drawing Sheets

Related U.S. Application Data

Aug. 1, 2012, now Pat. No. 8,386,578, which is a continuation of application No. 13/190,246, filed on Jul. 25, 2011, now Pat. No. 8,260,870, which is a continuation of application No. 12/566,364, filed on Sep. 24, 2009, now Pat. No. 8,065,375, which is a continuation of application No. 11/818,192, filed on Jun. 13, 2007, now Pat. No. 7,647,372, which is a continuation of application No. 11/353,792, filed on Feb. 14, 2006, now Pat. No. 7,389,320, which is a continuation of application No. 09/621,913, filed on Jul. 24, 2000, now Pat. No. 7,127,486.

(56) References Cited

U.S. PATENT DOCUMENTS

| | | | |
|---|---|---|---|
| 5,153,905 | A | 10/1992 | Bergeron et al. |
| 5,548,506 | A | 8/1996 | Srinivasan |
| 5,646,982 | A | 7/1997 | Hogan et al. |
| 5,802,299 | A | 9/1998 | Logan et al. |
| 5,805,809 | A | 9/1998 | Singh et al. |
| 5,848,397 | A | 12/1998 | Marsh et al. |
| 5,892,909 | A | 4/1999 | Grasso |
| 5,937,037 | A | 8/1999 | Kamel et al. |
| 5,937,162 | A * | 8/1999 | Funk .................. H04L 12/5835 709/206 |
| 5,970,491 | A | 10/1999 | Schreiber et al. |
| 5,978,836 | A | 11/1999 | Ouchi |
| 6,073,112 | A | 6/2000 | Geerlings |
| 6,073,142 | A | 6/2000 | Geiger et al. |
| 6,076,101 | A | 6/2000 | Kamakura et al. |
| 6,101,545 | A * | 8/2000 | Balcerowski ....... H04L 12/5875 370/464 |
| 6,119,151 | A | 9/2000 | Cantrell et al. |
| 6,161,149 | A | 12/2000 | Achacoso et al. |
| 6,167,435 | A | 12/2000 | Druckenmiller et al. |
| 6,236,977 | B1 | 5/2001 | Verba et al. |
| 6,304,550 | B1 | 10/2001 | Fox |
| 6,332,164 | B1 | 12/2001 | Jain |
| 6,351,745 | B1 | 2/2002 | Itakura et al. |
| 6,446,113 | B1 | 9/2002 | Ozzie et al. |
| 6,571,238 | B1 | 5/2003 | Pollack et al. |
| 6,701,322 | B1 | 3/2004 | Green |
| 6,732,185 | B1 | 5/2004 | Reistad |
| 6,854,007 | B1 | 2/2005 | Hammond |
| 6,868,395 | B1 | 3/2005 | Szlam et al. |
| 6,965,870 | B1 | 11/2005 | Petras et al. |
| 6,965,920 | B2 | 11/2005 | Pedersen |
| 7,003,517 | B1 | 2/2006 | Seibel et al. |
| 7,092,821 | B2 | 8/2006 | Mizrahi et al. |
| 7,127,486 | B1 | 10/2006 | Reistad et al. |
| 7,277,863 | B1 | 10/2007 | Hilerio et al. |
| 7,284,066 | B1 | 10/2007 | Philyaw et al. |
| 7,346,655 | B2 | 3/2008 | Donoho et al. |
| 7,389,320 | B2 | 6/2008 | Reistad et al. |
| 7,523,385 | B2 | 4/2009 | Nguyen et al. |
| 7,590,665 | B2 | 9/2009 | Thomas et al. |
| 7,647,372 | B2 | 1/2010 | Reistad et al. |
| 7,925,531 | B1 | 4/2011 | Cunningham et al. |
| 7,975,007 | B2 | 7/2011 | Reistad et al. |
| 8,065,375 | B2 | 11/2011 | Reistad |
| 8,234,334 | B2 | 7/2012 | Reistad et al. |
| 8,255,460 | B2 | 8/2012 | Reistad et al. |
| 8,260,870 | B2 | 9/2012 | Reistad |
| 8,386,578 | B2 | 2/2013 | Reistad |
| 8,805,945 | B2 | 8/2014 | Reistad |
| 9,118,615 | B2 | 8/2015 | Reistad et al. |
| 9,419,934 | B2 | 8/2016 | Reistad et al. |
| 9,515,979 | B2 | 12/2016 | Reistad et al. |
| 2001/0034723 | A1 | 10/2001 | Subramaniam |
| 2001/0034769 | A1 | 10/2001 | Rast |
| 2001/0042136 | A1 | 11/2001 | Guedalia et al. |
| 2002/0032638 | A1 | 3/2002 | Arora et al. |
| 2002/0032742 | A1 | 3/2002 | Anderson |
| 2002/0046091 | A1 | 4/2002 | Mooers et al. |
| 2002/0099812 | A1 | 7/2002 | Davis et al. |
| 2005/0209914 | A1 | 9/2005 | Nguyen et al. |
| 2006/0031412 | A1 | 2/2006 | Adams et al. |
| 2006/0184557 | A1 | 8/2006 | Pollack et al. |
| 2006/0224903 | A1 | 10/2006 | Ginter et al. |
| 2013/0132494 | A1 | 5/2013 | Reistad |
| 2017/0041278 | A1 | 2/2017 | Reistad et al. |

FOREIGN PATENT DOCUMENTS

| | | |
|---|---|---|
| JP | 10065730 | 3/1998 |
| WO | WO9613013 | 5/1996 |
| WO | WO9952026 | 10/1999 |
| WO | WO0109799 | 2/2001 |
| WO | WO0169432 | 9/2001 |
| WO | WO0208938 | 1/2002 |

OTHER PUBLICATIONS

Anonymous, Communications "IMA's Internet Exchange Server: Assuring Fast and Reliable Communications over the Net" Internet Exchange News, Online! vol. 2, No. 2, Feb. 1999, pp. 1-4.

"OS/2 Office: Delayed Delivery for Mail Items", IBM Technical Disclosure Bulletin, IBM Corp., New York, U.S., col. 34, No. 9, Feb. 1, 1992, pp. 381-382.

Borenstein, N., "Internet Multimedia Mail with MIME: Emerging Standards for Interoperability", IFIP Transactions C. Communications Systems, Elsevier Science B.V., Amsterdam, Netherlands, vol. C07, 1992, pp. 183-192.

"Auto-Elimination of Duplicate In-Basket items in Electronic Mail" IBM Technical Disclosure Bulletin, IBM Corp., New York, U.S., vol. 36, No. 3, Mar. 1, 1993, pp. 403-405.

Office Action for U.S. Appl. No. 09/621,913, dated Mar. 12, 2004, 6 pages.

Office Action for U.S. Appl. No. 11/353,792, dated Dec. 4, 2006, Reistad, 11 pages.

Office Action for U.S. Appl. No. 11/353,792, dated Aug. 10, 2007, Reistad, 11 pages.

International Preliminary Examination for International Patent Application No. PCT/US01/21403, dated May 4, 2006, 5 pages.

Office Action for U.S. Appl. No. 09/621,719 dated Jul. 16, 2002, 8 pages.

Office Action for U.S. Appl. No. 09/621,719 dated Mar. 17, 2003, 9 pages.

Office Action for U.S. Appl. No. 09/621,719 dated Sep. 10, 2003, 9 pages.

Office Action for U.S. Appl. No. 12/546,981 dated Sep. 17, 2010, 7 pages.

Office Action for U.S. Appl. No. 12/566,364 dated Nov. 29, 2010, 9 pages.

Office Action for U.S. Appl. No. 12/566,364 dated May 13, 2011, 8 pages.

Office Action for U.S. Appl. No. 12/546,220 dated Sep. 8, 2011, 8 pages.

Office Action for U.S. Appl. No. 13/110,342 dated Sep. 6, 2011, 9 pages.

Office Action for U.S. Appl. No. 13/190,246, dated Oct. 6, 2011, 13 pages.

Office Action for U.S. Appl. No. 13/528,152, dated Oct. 12, 2012, 8 pages.

Office Action issued for U.S. Appl. No. 13/745,192, dated Sep. 12, 2013, 7 pages.

"Livelink Administration: Introduction to livelink," Livelink® Version 9, Copyright © 1995-1999, Open Text Inc., 167 pages.

"Livelink Help: Task Lists," Livelink® Version 8, Copyright © 1995-1999 by Open Text Inc., 5 pages.

"Livelink Help: Create a Workflow Map," Livelink® Version 8, Copyright © 1995-1999 by Open Text Inc., 38 pages.

"Livelink Help: Workflow Overview," Livelink® Version 8, Copyright © 1995-1999 by Open Text Inc., 22 pages.

"Livelink Help: Change Agents Overview," Livelink® Version 8, Copyright © 1995-1999 by Open Text Inc., 10, pages.

(56) References Cited

OTHER PUBLICATIONS

"Livelink Help: Users and Groups," Livelink® Version 8, Copyright © 1995-1999 by Open Text Inc., 13 pages.
"Livelink Help: Projects," Livelink® Version 8, Copyright © 1995-1999 by Open Text Inc., 18 pages.
"Livelink Help: Glossary," Copyright © 1995-1999 by Open Text Inc., 13 pages.
"Livelink Intranet: Web Client-Quick Start," Copyright © 1997 by Open Text Corporation, 113 pages.
"Livelink: Livelink8—Quick Start," Open Text Livelink®, Copyright © 1995-1998 by Open Text Corporation, 108 pages.
"Livelink Intranet: Web Client User's Guide," Version 7.1, Copyright © 1996 by Open Text Corporation, 202 pages.
"Livelink Intranet: Livelink Change Agents™—Notification User's Guide," Open Text Intranet, Copyright © 1997 by Open Text Corporation, 32 pages.
"Livelink Intranet: Wide Client User's Guide," Version 7.1, Copyright © 1996 by Open Text Corporation, 278 pages.
"Livelink Intranet: Evaluation Kit—Tutorial," Version 7.0, Oct. 1996, Copyright © 1996 by Open Text Corporation, 59 pages.
"Livelink: Intranet Suite—Tour Guide," Document revision 7.1c, Jan. 1997, Copyright © 1997 by Open Text Corporation, 28 pages.
"Livelink Intranet: Client and System—Administrator's Guide," Document revision 7.1d, Copyright © 1997 by Open Text Corporation, 162 pages.
Balla et al, "Marketfouc Report—Executive Brief: Functional Assessment of Open Text myLivelink," Doculabs 2000 ©, 16 pages.
"Livelink: Installation Guide," Open Text Corporation, Copyright © 1999 by Open Text Corporation, 212 pages.
"Livelink: Livelink API Developers's Reference," Open Text Intranet, Copyright © 1999 by Open Text Corporation, 544 pages.
"What is Livelink Intranet?" [retrieved from <<http://web.archive.org/web/19961113034156/http://www.opentext.com/livelink/otm_11_11.html[Jul. 4, 2012 1:01:59 PM>>], 4 pages.
"Livelink8®; Frequently Asked Question," May 11, 1998, 14 pages.
"Livelink® 9.0 Feature Preview," Open Text Corporation, Jun. 13, 2000, 15 pages.
"Livelink® 9.0.0 New Feature List," Open Text Corporation, Oct. 2000, 16 pages.
"Livelink OnTime®—What is Livelink OnTime?" Open Text Corporation, Copyright © 2000 by Open Text Corporation, 2 pages.
"Livelink® 9.0.0 Product Summary," Open Text Corporation, Oct. 2000, 57 pages.
"MyLivelinkTM—What is myLivelink?" Open Text Corporation, Copyright © 2000 by Open Text Corporation, 2 pages.
"Livelink® QuickStart for Users," Open Text Corporation, Copyright © 2000 by Open Text Corporation, 76 pages.
"Livelink: Quick for Users," Open Text Corporation, Copyright © 1999 by Open Text Corporation, 96 pages.
"Livelink Intranet: Intranet Server and Search Installation Guide," Copyright © 1997 by Open Text Corporation, 93 pages.
"Livelink Intranet: Developer's Guide—Web Client," Copyright © 1997 by Open Text Corporation, 468 pages.
"Livelink8—Installation Guide," Open Text Intranet, Copyright © 1998 by Open Text Corporation, 233 pages.
Office Action issued for U.S. Appl. No. 13/528,152, dated Sep. 19, 2014, 7 pages.
"Order Granting Motion to Dismiss" *Open Text S.A.*, Plaintiff v. *Alfresco Software Ltd. et al.*, Defendants, Case No. 13-CV-04843-JD, signed Sep. 19, 2014, 5 pages.
"Intra.doc! Management System Archiver Guide", Copyright 1998 by IntraNet Solutions, Inc., 32 pages.
"Intra.doc! Management System, Batch Loader," Version 3.0.3, Copyright 1996, 1997, 1998 by IntraNet Solutions, Inc., 28 pages.
"Archiver Installation for NT," Intra.doc! Arciver, Version 3.5, Sep. 29, 1998, 1 page.
"Intra.doc! Management System Installation Guide for Windows NT," Version 3.5, Copyright 1996, 1997, 1998 by IntraNet Solutions, Inc., 51 pages.
"ODMA Intra.doc! Client Installation," Version 2,0, Copyright 1996, IntraNet Solutions, Inc., 8 pages.
"Using the Intra.doc! Management System with the ODMA Intra.doc! Client," Version 2.0, Copyright 1998, 1997, 1998 by IntraNet Solutions, Inc., 48 pages.
"Release Notes,"Intra.doc! Management System, Version 3,5, Sep. 30, 1998, 5 pages.
"Intra.doc! Management System Installation Guide for Solaris," Version 3.5, Copyright 1996, 1997, 1998 by IntraNet Solutions, Inc., 35 pages.
"Intra.doc! Management System Properties," Version 3.5, Copyright 1996, 1997, 1998 by IntraNet Solutions, Inc., 14 pages.
"Intra.doc! Management System Administration Guide," Version 3.5, Copyright 1996, 1997, 1998 by IntraNet Solutions, Inc., 124 pages.
"Intra.doc! Management System Update Installation Guide for Windows NT," Version 3.5, Copyright 1996, 1997, 1998 by IntraNet Solutions, Inc., 20 pages.
"Intra.doc! Management System User Guide," Copyright 1998, 1997, 1998 by IntraNet Solutons, Inc., 111 pages.
Rogers, S. et al., "Novell's GroupWise 5.5 Administrator's Guide," Copyright 1999 by IDG Books Worldwide, 7 pages.
"GroupWise 5.5 Read Me," Copyright 1998 by Novell, Inc., Jul. 15, 1998, 12 pages.
"GroupWise 5.5 Monitor ReadMe," Copyright 1998 by Novell, Inc., Jul. 15, 1898, 2 pages.
"GroupWise Backup Utilities," GroupWise, Jun. 17, 1998, 8 pages.
<readme.txt>, GroupWise Enhancement Pack, Aug. 14, 1996, 6 pages.
"Novell Pre-Release Software License Terms and Conditions," Novell, Inc., Jun. 13, 1996, 2 pages.
"GroupWise 5.5 ReadMe," Copyright 1998 by Novell, Inc., Jul. 15, 1998, 2 pages.
<gwtipus.txt.>, GroupWise 5.5 Help, Apr. 29, 1998, 8 pages.
"End-User License Agreement for Microsoft Imaging Software for Windows 95," Dec. 21, 1995, 5 pages.
"readme.txt," GroupWise 4.1 Async Gateway v2 NLM, Jul. 9, 1998, 16 pages.
<smtpuser.txt.>, GroupWise, Mar. 19, 1996, 9 pages.
<preambe.txt>, GroupWise, Oct. 20, 1995, 1 page.
"GroupWise 5.5 Internet Agent Readme," Copyright 1998 by Novell, Inc., Jul. 15, 1998, 3 pages.
"User's Guide for Windows 32-Bit," GroupWise, Version 5.5, Copyright 1998 by Novell, Inc., 322 pages.
Sinclair, J. et al, "Intranets vs. Lotus Notes," AP Professional, Copyright 1997 by Academic Press, Inc., 38 pages.
Tamura, R. et al., "Lotus Notes and Domino Server 4.5," Copyright 1997 by Sams Publishing, 1119 pages.
Brown, K. et at, "Mastering Lotus Notes 4," Copyright 1996 by SYBEX Inc., 1034 pages.
Londergan, S., "The Lotus Domino Server: Integrating Lotus Notes 4.5 with the Internet," Copyright 1997 by M&T Books, 621 pages.
"Welcome to evite.com," retrieved from <<https://web.archive.org/web/19990420183508/http://www.evite.com/>>, Apr. 20, 1999, 1 page.
"What is Evite.com?," retrieved from <<https://web.archive.org/web/1990508182017/http://www.evite.com/register/benefits>>, May 8, 1999, 1 page.
Mann, E. et al., "PCWEEK Guide to Lotus Notes Release Notes 4," WorkGroup Systems Inc., Copyright 1996 by Macmillan Computer Publishing USA, 70 pages.
"Product Information Asset Management Solution," Whirlpool Corporation, Sep. 13, 1996, 120 pages.
Casselberry, R. et al., "Running a Perfect Intranet, Chapter 7—Installing and Configuring the Lotus Notes Web Publishing Products," retrieved from <<http://mm.iit.uni-miskolc.hu/Data/texts/BOOKS/Running_a_Perfect_Intranet/ch7.htm>>, Copyright 1996 by Que Corporation, 23 pages.
Grous, Paul J., "Creating and Managing a Web Site with Lotus' InterNotes Web Pulblisher," The View, Sep./Oct. 1995, pp. 3-18.
"What Was New in Domino 1.5 Release Candidate 2?," Lotus Domino Release Notes, retrieved from <<http://web.archive.org/web/19770415174825/http://domino.lotus.c...

(56) References Cited

OTHER PUBLICATIONS

085256324006d4ddc/
d759d23d6a75aca8852563ee0076fe60?OpenDocument>>Apr. 15, 1997, 2 pages.
Andersen, et al., "MMS: An Electronic Message Management System for Emergency Response," IEEE Transactions on Engineering Management, vol. 45, No. 2, May 1998, pp. 132-140.
Chan, W. et el., "Collaborative Scheduling over the Internet," Computer-Aided Civil and Infrastructure Engineering, vol. 14, Issue 1, Jan. 1999, pp. 15-24.
Rogers, S. et al., "Novell's GroupWise 5.5 User's Handbook," Copyright 1998 by Novell, Inc., 277 pages.
Garrett, D. et el., "Intranets Unleashed," Copyright 1996 by IntraACTIVE, Inc., 928 pages.
Leland, M. et al., "Collaborative Document Production Using Quilt," Copyright 1998 by ACM, pp. 206-215.
"Web Client User's Guide," Livelink Intranet, Version 7.1, Copyright 1996 by Open Text Corporation, 202 pages.
Medina-Mora, R. et al,, "The Action Workflow Approach to Workflow Management Technology" CSCW 92 Proceedings, Nov. 1992, pp. 281-288.
Schement, J. et al., "Between Communication & Information," vol. 4, Copyright 1993 by Transaction Publishers, 32 pages.
Rae, N. et al, "Advertising on the Web: Effects of Schema Congruity and the Effectiveness of a Single Adview," Proceedings of the Australia New Zealand Marketing Academy Conference, Nov. 30-Dec. 2, 1998, pp. 2092-2097.
Seacrest, S. et al., "Global Climate Change and Public Perception: The Challenge of Translation," Journal of the American Water Resources Association, Vol, 36, No. 2, Apr. 2000, pp. 253-263.
Thimm, H "A Multimedia Enhanced CSCW Teleservice for Wide Area Cooperative Authoring of Multimedia Documents," ACM SIGOIS Bulletin—Special Issue on Workshop Write-Ups and Position Papers from CSCW'94, vol. 15, Issue 2, Dec. 1994, pp. 49-57.
"WebProject Collaboration Examples." WebFlow, retrieved from <<http://www.webflow.com/products/EXAMPLESwp.html>>, Jun. 12, 1997, 6 pages.
Ball, Steve, "SurfIt!—A WWW Browser," Proceedings of the Fourth USENIX Tcl/TK Workshop, Jul. 1996, 12 pages.
WS_FTP Pro User's Guide, Software Version 5, Copyright 1998 by Ipswitch, Inc., 104 pages.
M. Satyanarayanan et al., Coda File System User and System Administrators Manual, Aug. 1997, 82 pages.
Mason, David C. et al, "GNOME User's Guide," Copyright 1999 by Red Hat Software and David A Wheeler, 110 pages.
U.S. Pat. No. 7,590,665, "System and Method for the Synchronization of a File in a Cache" File History, compiled Jul. 18, 2013, 294 pages.
"What is new?," Code File System—News, Aug. 12, 1999, 5 pages.
"The Truth Behind Red Hat/Fedora Names," retrieved from <<http://www.smoogespace.com/documents/behind_the_names. html>> Jul. 21, 2003, 14 pages.
Greenberg, Saul et al., "GroupWeb: A WWW Browser as Real Time Groupware," 1996, 2 pages.
Jang Ho Lee, et al, "Supporting Multi-User, Multi-Applet Workspaces in CBE," Computer Supported Cooperative Work '96, Copyright 1996 by ACM, 11 pages.
"Fourth annual USENIX Tcl/TK Workshop, 1998," Jul. 10-13, 1996, 4 pages.
Appelt, Wolfgang, "CoopWWW—Interoperable Took for Cooperation Support using the World-Wide Web," Proceedings of the ERCIM Workshop on CSCW and the Web, Feb. 1996, 3 pages.
Bentley, Richard et al., "Supporting Collaborative information Sharing with the World Wide Web: The BSCW Shared Workspace System," retrieved from <<http://www.w3.org/Conferences/WWW4/Papers/151/>>, Sep. 25, 2013, 11 pages.
<readme.txt>, BSCW-2.1, Sep. 25, 1996, 4 pages.
Appelt, Wolfgang et al., "The BSCW: A WWW-Based Application to Support Cooperation of Distributed Groups," Proceedings of WET ICE '96, Copyright 1995 by IEEE, 6 pages.

Roseman, Mark et al., "TeamRooms: Network Places for Collaboration," Mar. 1, 1996, retrieved from <<http://hdl.handle.net/1880/45961>>, 10 pages.
Roseman, Mark, "Managing Complexity in TeamRooms, a Tcl-Based Internet Groupware Application," 1996, 8 pages.
Groupwise 5 Readme.txt, Nov. 5, 1996, 24 pages.
Groupwise 5.5 Readme.txt, Oct. 2, 1998, 14 pages.
Installing Lotus Products on a Network Server, Jan. 3, 1996, 6 pages.
"Using TCP/IP Applications with the Novell IPX/IP Gateway," Novell Internet Access Server 4, Sep. 9, 1996, 4 pages.
"NetWare UNIX Print Services 2.11," Sep. 5, 1996, 7 pages.
Red Hat Linux/Intel 5.1 (Manhattan), Copyright 1995 by Red Hat Software, Inc., May 7, 1998, 2 pages.
Red Hat Linux 5.1 (Manhattan), Copyright 1998 by Red Hat Software, Inc., May 7, 1998, 1 page.
Dennis, Alan R. et al., "TCBWorks: A First Generation Web-Groupware System," Proceedings of the Thirtieth Annual Hawaiian International Conference on System Sciences, Copyright 1997 by IEEE, 10 pages.
Miller, Michael, "Using Prodigy," Copyright 1995 by Qua Corporation, 365 pages.
December, John et al., "The World Wide Web Unleashed Second Edition," Copyright 1995 by Sams.net Publishing, 1358 pages.
Personal Computing Magazine Network Edition, vol. 13, No. 11, Jun. 14, 1994, 533 pages.
Personal Computing Magazine Network Edition, vol. 15, No. 17, Oct. 8, 1996, 518 pages.
"BCSW Version 3.0 Help," Copyright 1997 by GMD and horz informatik, 75 pages.
Tatters, Wes, "Navigating the Internet with CompuServe," Copyright 1995 by Sams.net Publishing, 484 pages.
Info World, vol. 18, Issue 25, Jun. 1, 1936, 184 pages.
"BSCW User Manual," Copyright 1998 by BSCW project, 51 pages.
"Livelink Intranet Netscape Client User's Guide," Livelink Version 4.0, Copyright 1998, Open Text Corporation and Open Texas U.S.A., Inc., 17 pages.
"Livelink Intranet Netscape Client User's Guide," Livelink Version 4.0, Copyright 1996, Open Text Corporation and Open Texas U.S.A., Inc., 78 pages.
Baecker, Ronald M., "Readings in Groupware and Computer-Supported Cooperative Work Assisting Human-Human Collaboration," Copyright 1993 by Morgan Kaufmann Publishers, Inc., 882 pages.
"Livelink Intranet Livelink Wide Client User's Guide," Version 4.0, Copyright 1996, Open Text Corporation and Open Texas U.S.A, Inc., 418 pages.
Casselberry, R. et al., "Running a Perfect Intranet, Chapter 18—Groupware Applications," Copyright 1996 by Que Corporation, 23 pages.
Dallas, Alastair, "Special Edition Using Collabra Share 2," Copyright 1996 by Que Corporation, 533 pages.
WWW4 Program, retreived from <<http://www.w3.org/Conferences/WWW4.Tuesday.html, Dec. 12, 1995, 6 pages.
"WebShare Designer," Copyright 1996 by Radnet, Inc., 7 pages.
"Release Notes for Radnet Release 1.0," 1996, 5 pages.
"Tell Me About Domino Release 1.5," Dec. 10, 1994, retrieved <<http://web.archive.org/web/19961210003929/http://domino.lotus.co...785256316007db7a0/
aafe8fcf4b036193852563a1000210c0?OpenDocument>>, 2 pages.
"Getting Started Creating Web Applications With Domino!," Dec. 10, 1994, retrieved from <<http://web/archive.org/web/19961210002825/http://domino.lotus...85256316007db7a0/
9ce89123e9466db8525637a006d857b?OpenDocument>>, 21 pages.
Stack, Bob et al, "Understanding and Deploying the InterNotes Web Navigator," The View, Jul./Aug. 1996, Copyright by Wellesley Information Services, 14 pages.
"Outline by Chapter," Jun. 27, 2014, 2 pages.
"The Unofficial MSQL FAQ," Jan. 1, 1996, 43 pages.
"Functional Overview," Jun. 27, 2014, 2 pages.
"Technical Overview," Jun. 27, 2014, 2 pages.

(56) References Cited

OTHER PUBLICATIONS

"Microsoft License Agreement for Microsoft MSDN Library Companion to Visual J++ Technology Preview 1," Microsoft Corporation, Jan. 19, 1994, 2 pages.
"Microsoft SQL Server Microsoft SQL Server ODBC Driver Setup Readme, Version 3.6," Jun. 27, 2014, 6 pages.
"Release Notes for Microsoft ODBC Driver for Oracle," Copyright 1997 by Microsoft Corporation, 2 pages.
"Release Notes for Microsoft Visual FoxPro ODBC Driver Version 6.0," Copyright 1998 by Microsoft Corporation, Jan. 19, 1998, 7 pages.
"Microsoft License Agreement for Microsoft Visual J++ Technology Preview 1, Pre-release Version," Microsoft Corporation, Jan. 19, 1994, 2 pages.
"Microsoft ActiveX Data Objects version 2.0 Readme File," Copyright 1998 by Microsoft Corporation, 3 pages.
"Microsoft Remote Data Service version 1.1 Readme File," Copyright 1997 by Microsoft Corporation, 7 pages.
"Microsoft OLE DB Provider for Jet version 3.52 Readme File," Copyright 1998 by Microsoft Corporation, 4 pages.
"Microsoft OLE DB Provider for Oracle Readme File," Copyright 1998 by Microsoft Corporation, 1 page.
"Microsoft OLE DB Provider ODBC Readme File," Copyright 1998 by Microsoft Corporation, 1 page.
Maher, David G., "AccessWatch—Access Accounting for World Wide Web Sites," Copyright 1994-1996 by David G. Maher, 2 pages.
"TCBWorks Webware for Teams Installation Information & Instructions," Copyright 1996 by The University of Georga Research Foundation, 4 pages.
Wusage Key Order Form, Jun. 27 2014, 2 pages.
Wusage 4.1 Copyright 1996 by Boutell.Com, Inc. and Cold Spring Harbor Laboratory, 1 page.
"Mini SQL Access Control," Jun. 27, 2014, 1 page.
Mini SQL 1.0 Invoice, Fiddich Technologies, Jun. 27, 2014, 2 pages.
Dennis, Alan R., "Lessons from Three Years of Web Development," Communications of the ACM, vol. 41, No. 7, Jul. 1998, pp. 112-113.
Wheeler, Bradley C., "Groupware Comes to the Internet: Charting a New World" The Data Base for Advances in Information Systems, vol. 30, No. 3,4, Summer-Fall 1999, pp. 8-21.
Groupware on the Web, Jun. 27, 2014, 4 pages.
Dennis, Alan et al., "TCBWorks: Using a Web-Groupware Research for Teaching and Research," International Conference on Information Systems (ICIS) 1996 Proceedings, Paper 84, 2 pages.
Dennis, Alan R. et al., "Lessons from the Early Adopters of Web Groupware," Journal of Management Information Systems, Spring 1998, vol. 14, No. 4, pp. 65-86.
Dennis, Alan et al., "TCBWorks: Experiences from a First-Generation Web-Groupware System," Jun. 27, 2014, 6 pages.
"Groupware: The Web Changes Everything," Jun. 27, 2014, 1 page.
Dennis, Alan R. et al., "Developing Groupware for the Web," Jun. 27, 2014, 5 pages.
"FindFirstChangeNotification," Oct. 12, 2000, retrieved from <<http://nukz.net/reference/fileio/hh/winbase/filesio_9hgu.htm>>, 2 pages.
Guy, Richard et al., "Rumor: Mobile Data Access Through Optimistic Peer-to-Peer Replication," Jun. 27, 2014, 12 pages.
"ReadDirectoryChangesW," Oct. 12, 2000, retrieved from <<http://nukz.net/reference/fileio/hh/winbase/filesio_97av.htm>>, 3 pages.
Ogle, David M., "Practical Experience with OS/2 Installable File Systems," Software—Practice and Experience, vol. 22(7), May 6, 1991, pp. 537-551.
Reiher, Peter, "Rumor 1.0 User's Manual," 1998, 9 pages.
Dalrymple, Robert, "xfm 1.3," Linux Journal, Jul. 1, 1995, retrieved from <<http://www.linuxjournal.com/article/1074>>, 3 pages.
Dalrymple, Robert, "xfrn 1.3," Linux Journal, Jul. 1, 1995, retrieved from <<http://www.linuxjournal.com/article/1074?page=0,1>>, 3 pages.
Dalrymple, Robert, "xfm 1.3," Linux Journal, Jul. 1, 1995, retrieved from <<http://www.linuxjournal.com/article/1074?page=0,1>>, 2 pages.
"README for Internet Connection Wizard," Jul. 1997, Copyright 1997 by Microsoft Corporation, 3 pages.
"README for Internet Explorer 4.0," Nov. 1997, Copyright by Microsoft Corporation, 9 pages.
"End-User License Agreement for Microsoft Software," Microsoft Internet Explorer, Version 4.0, and Software Related Components, Jun. 27, 2014, 4 pages.
"Support.txt for Microsoft Internet Explorer 4.0 for Microsoft Windows 95 and Windows NT," Aug. 1997, Copyright by Microsoft Corporation, 15 pages.
"End-User License Agreement for Microsoft Internet Mail and News," Jun. 27, 2014, 3 pages.
"README for Microsoft Outlook™ Express," Sep. 1997, Copyright 1997 by Microsoft Corporation, Nov. 1997, 8 pages.
"Microsoft Microsoft Chat README," Copyright by Microsoft Corporation, Mar. 1997, 15 pages.
"End-User License Agreement for Microsoft Software," Microsoft Netmeeting 2.1, Jun. 27, 2014, 4 pages.
"README for Microsoft NetMeeting 2.1," Copyright by Microsoft Corporation, Oct. 1997, 18 pages.
"End-User License Agreementfor Microsoft Software," Microsoft Web Publishing Wizard, Jun. 27, 2014, 3 pages.
"README for Internet Explorer 4.0," Sep. 1997, Copyright by Microsoft Corporation, 14 pages.
<Internet Explorer 4.0.pdf>, Jun. 27, 2014, 1 page.
"Software License Agreement," Manufacturer IntraNet Solutions, Inc., Jun. 27, 2014, 3 pages.
"SEARCH '97 Information Server V3.1," Jun. 27, 2014, 6 pages.
"start.txt: PC Platforms: R5," Jun. 27, 2014, 2 pages.
Kroeger, Thomas M. et al., "CREW Access Control Service Design Specification," Version 0.70, Mar. 3, 1996, 8 pages.
"Admin Training Agenda," Crew Administrator, Jun. 27, 2014, 1 page.
Mansour, Steve, "CREW System Architecture," Version 0.95, Oct. 5, 1995, 9 pages.
Haytko, Moonhee, "CREW Calendar Design Specification," Version 0.07, Mar. 25, 1996, 23 pages.
Pfutzenreuter, Dean, "Crew Card Server and Database Design Specification," Version .6, Aug. 7, 1995, 16 pages.
"Technical Support and Contact Information" Crew, Jun. 27, 2014, 1 page.
"CREW Channel Partner Checkoff List," CREW Channer Partner Product Training, Jun. 27, 2014, 2 pages.
"Channel Partner Product Training Agenda," Dec. 18, 1999, 1 page.
"CREW Review," Jun. 27, 2014, 1 page.
"Your CREW Office," Crew Training Guide *DRAFT*, Jun. 27, 2014, 27 pages.
"Crew Groupware for the Internet/Intranet Administration and Maintenance Guide," Revision 1.0, Copyright 1996 by Thuridion, 51 pages.
"License Agreement," Thuridion, Jun. 27, 2014, 1 page.
"Crew Groupware for the Internet/Intranet Quick Start Guide," Copyright 1996 by Thuridion, 19 pages.
Crew Messenger—Inbox, Figures 1-5, Jun. 27, 2014, 3 pages.
Galpin, Dan et al., "Crew URL Design Specification," Version 1.00, Dec. 11, 1995, 10 pages.
"CREW Demo Split," Crew Office, Jun. 27, 2014, 4 pages.
Mansour, Steve, "CREW Error Service Design Specification," Version 0.1, Jul. 31, 1996, 8 pages.
Pfutzenreuter, Dean, "Crew File Service Design Specification," Version .10, Oct. 30, 1995, 11 pages.
Francis, John, "CREW Groups Proposal," Version 1.0, Mar. 21, 1996, 7 pages.
Kroeger, Thomas M., "CREW Guest User Specification Design Specification," Version 0.01, Mar. 5, 1996, 2 pages.
Channel Partner Sales Training Agenda, Thuridion, 1996, 2 pages.
Mansour, Steve, "CREW Locker," Version 0.1, Oct. 23, 1995, 8 pages.
CREW Training, Thuridion, Aug. 29, 1996, 5 pages.

(56) References Cited

OTHER PUBLICATIONS

Mansour, Steve, "CREW Messenger Design Specification," Version 0.85, Feb. 21, 1996, 15 pages.
"Rowers' Shortcuts," CREW, Jun. 27, 2014, 4 pages.
Mansour, Steve, "MEMORANDUM, re: Current CREW Status," Jun. 27, 2014, 1 page.
Mansour, Steve, "CREW Product Description," Version 0.47, Aug. 10, 1995, 34 pages.
Mansour, Steve, "TM Desgn Specification," Version 1.01, Oct. 25, 1996, 16 pages.
"User Training Agenda," CREW, Dec. 6, 1998, 1 page.
Mansour, Steve, "CREW Web Calendar Design Specification," Version 0.2, Mar. 16, 1998, 7 pages.
Roseman, Mark, "README for Windows TeamRooms 1.0 Beta 4," Nov. 1, 1996, 2 pages.
<_alfresco file listing.txt>, 2011, 82 pages.
<_DEFS001094_codarpms_listings.txt>, 1997, 109 pages.
<_DEFS013953_CollabraShare_listing.txt>, 1994, 5 pages.
<_DEFS013954_WarFTPDaemon_listing.txt>, 2014, 1 page.
<_DEFS013955_TCBWorks_listing.txt>, 2014, 1 page.
<_DEFS013956_WebShare_listing.txt>, 2014, 1 page.
<_DEFS013957_Intra.Doc_listing.txt>, 20 pages.
<_DEFS013958_DocuShare_listing.txt>, 1 page.
<_DEFS013959_AbsoluteFTP_listing.txt>, 2014, 1 page.
<_DEFS013960_coupling32_listing.txt>, 2014, 1 page.
<_DEFS013961_CuteFTP_listing.txt>2014, 1 page.
<_DEFS013962_f32e20_listing.txt>, 2014, 1 page.
<_DEFS013963_ftpNetDrive_listing.txt>, 2014, 1 page.
<_DEFS013964_ftpVoyager_listing.txt>, 2014, 1 page.
<_DEFS013965_g32d301p_listing.txt>, 2014, 1 page.
<_DEFS013966_MagellanExplorer_listing.txt>, 2014, 1 page.
<_DEFS013967_oif32_listing.txt>, 2014, 1 page.
<_DEFS013968_WebDrive_listing.txt>, 2014, 1 page.
<_DEFS013969_BSCW2_listing.txt>, 1996, 12 pages.
<_DEFS013971_GW55_listing.txt, 1997>, 98 pages.
<_DEFS013972_GWWFP_listing.txt>, 1996, 1 page.
<_DEFS013973_NOTES-R5-IE_listing.txt>, 1998, 10 pages.
<_DEFS013974_NotesR4_listing.txt>, 1997, 14 pages.
<_DEFS013975_RH5-1.D1_listing.txt>, 1997, 93 pages.
<_DEFS013977_CREW_listing.txt>, 1996, 3 pages.
<_DEFS013978_Teamrooms_listing.txt>, 1996, 1 page.
<_DEFS013979_TreeComp-3-6_listing.txt>, 1995, 1 page.
<_DEFS018228_GW55-ADMIN_listing.txt>, 1996, 99 pages.
<_DEFS018231_VanDyke_listing.txt>, 2014, 1 page.
Roseman, Mark et al., "Building Real-Time Groupware with GroupKit, a Groupware Toolkit," ACM Transactions on Computer-Human interaction, vol. 3, No. 1, Mar. 1996, pp. 66-106.
<_DEFS001093_GW5_listing.txt>, 1996, 1158 pages.
Pangko, Raymond, "Designing Groupware for Implementation," Designing Groupware for Implementation, Between Communication and Information, Information & Behavior, vol. 4, 1993, 35 pages.
Office Action issued for U.S. Appl. No. 14/325,313, dated Aug. 12, 2015, 7 pages.
Office Action issued for U.S. Appl. No. 14/329,715, dated Feb. 4, 2016, 5 pages.

* cited by examiner

METHOD AND SYSTEM FOR MESSAGE PACING

CROSS-REFERENCE TO RELATED APPLICATIONS

This application is a continuation of, and claims a benefit of priority under 35 U.S.C. 120 of the filing date of U.S. patent application Ser. No. 14/325,313, filed Jul. 7, 2014, entitled "Method and System for Message Pacing," issued as U.S. Pat. No. 9,419,934, which is a continuation of, and claims a benefit of priority under 35 U.S.C. 120 of the filing date of U.S. patent application Ser. No. 13/745,192, filed Jan. 18, 2013, entitled "Method and System for Message Pacing," now U.S. Pat. No. 8,805,945, which is a continuation of, and claims a benefit of priority under 35 U.S.C. 120 of the filing date of U.S. patent application Ser. No. 13/564,532, filed Aug. 1, 2012, entitled "Method and System for Message Pacing," issued as U.S. Pat. No. 8,386,578, which is a continuation of, and claims a benefit of priority under 35 U.S.C. 120 of the filing date of U.S. patent application Ser. No. 13/190,246, filed Jul. 25, 2011, entitled "Method and System for Message Pacing," issued as U.S. Pat. No. 8,260,870, which is a continuation of, and claims a benefit of priority under 35 U.S.C. 120 of the filing date of U.S. patent application Ser. No. 12/566,364, filed Sep. 24, 2009, entitled "Method and System for Message Pacing," issued as U.S. Pat. No. 8,065,375, which is a continuation of, and claims a benefit of priority under 35 U.S.C. 120 of the filing date of U.S. patent application Ser. No. 11/818,192, filed Jun. 13, 2007, entitled "Method and System for Facilitating Marketing Dialogues," issued as U.S. Pat. No. 7,647,372, which is a continuation of, and claims a benefit of priority under 35 U.S.C. 120 of the filing date of U.S. patent application Ser. No. 11/353,792, filed Feb. 14, 2006, entitled "Method and System for Facilitating Marketing Dialogues," issued as U.S. Pat. No. 7,389,320, which is a continuation of, and claims a benefit of priority under 35 U.S.C. 120 of the filing date of U.S. patent application Ser. No. 09/621,913, filed Jul. 24, 2000, entitled "Method and System for Facilitating Marketing Dialogues," issued as U.S. Pat. No. 7,127,486, all of which are fully incorporated herein by reference.

FIELD OF THE INVENTION

This invention relates to methods and systems for managing online and other communications.

BACKGROUND OF THE INVENTION

With the growth of use of the Internet, more and more people have access to e-mail, and more and more entities use e-mail to communicate with customers, potential customers, or other people of interest. In, for example, a marketing context, companies periodically send e-mails to customers with new product information, special offers, company news, or other information.

As a result, recipients find themselves receiving more e-mails than they want to read. Recipients may get angry at the sender, may "opt-out" of further mailings (if that option is available), or may simply stop reading the mailings. Thus, the benefits from sending mailings are reduced and recipients may not get information they otherwise would have found useful.

SUMMARY OF THE INVENTION

According to the present invention, message volume and timing is managed, preferably for both messages from a single message source and messages from multiple, independent message sources. In one embodiment, a centralized message pacing system is used, which regulates when messages are sent to recipients. In another embodiment, each message source uses a commonly-accessible data repository to determine when it sends messages, so that the timing of messages from each message source is coordinated.

The invention permits messages to be spaced at regular or other periods, depending on the type of message, its priority, or other factors. In addition, the invention permits messages to be combined in accordance with a set of rules, so as to reduce the number of separate messages that each recipient receives. Also, the invention permits the pacing of messages to be monitored, so that if a message is not sent to a recipient within a specified time period, one or more message sources are notified. Either the sender or the recipient can have control over the message pacing, both with respect to the timing of messages and the types of messages.

The invention is applicable generally to various types of communications channels. In a preferred embodiment, the invention is used in conjunction with a marketing system, such as the system described in commonly-assigned patent application Ser. No. 09/621,913, entitled "Method and System for Facilitating Marketing Dialogues," which is incorporated herein by reference.

DETAILED DESCRIPTION OF PREFERRED EMBODIMENTS

Figure 1:
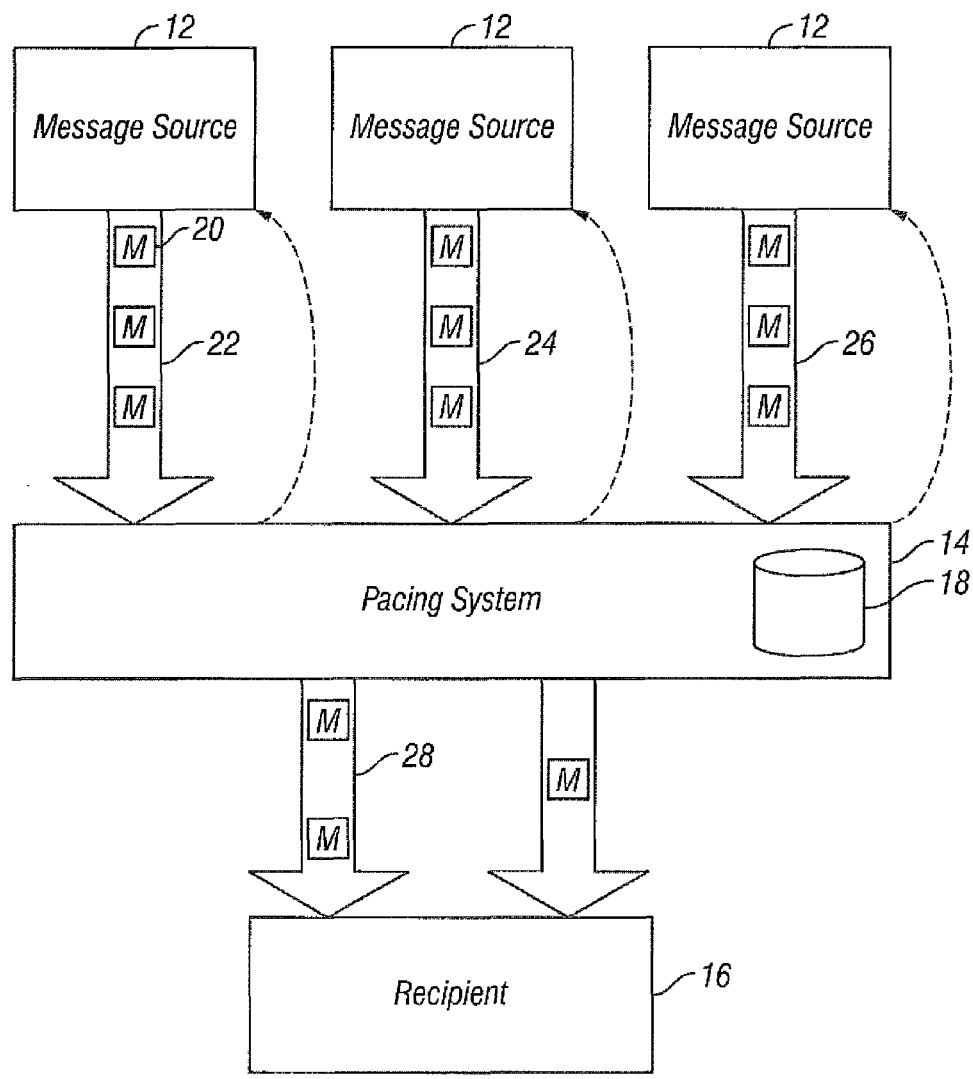
FIG. 1 is a block diagram of a system according to an embodiment of the present invention.

Referring to FIG. 1, a network includes various message sources 12, a pacing system 14, and a recipient 16. Although only a single recipient is shown, for clarity, it is understood that the pacing system may be applied to multiple recipients. Pacing system 14 includes a data storage system 18, such as a database system, that is used to store pacing and message information. Messages 20 intended for recipient 16 (and possibly for other recipients as well) are sent from message sources 12 over communication paths 22, 24, and 26 to pacing system 14. Although shown as separate communication paths, paths 22, 24, and 26 could all be part of a single network, such as the Internet. The communication paths also could involve wide area networks (WANs), local area networks (LANs), dedicated communication paths, or any other communication channel. Or, the message sources 12 and pacing system 14 could be components on the same system, using direct procedure calls or inter-process communications.

Pacing system 14 forwards messages 20 on to recipient 16 over one or more channels 28 according to a pacing algorithm. For example, messages may be delivered no more than once every n time units (such as once every 7 days). The value of n can be different for each recipient, and can vary for different types of messages or different delivery channels. In a preferred embodiment, one channel 28 is an e-mail channel and a second channel is a phone channel. Facsimiles, pagers, regular mail, and any other communication channel could also be included.

Figure 2:
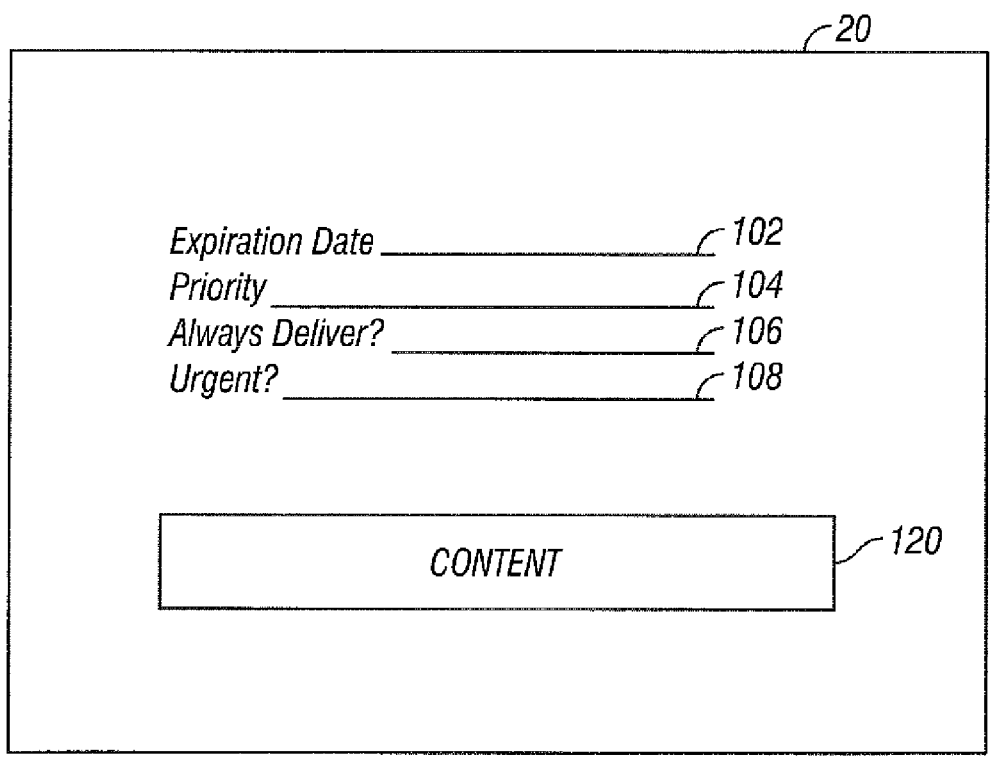
FIG. 2 is a representation of a structure for use with an embodiment of the present invention.

Preferably, as shown in FIG. 2, each message 20 that pacing system 14 receives has, in addition to its content 120 (including the identity of the recipient, the recipient's address, and the message to be delivered), a set of delivery properties, including: an expiration date 102 and a priority 104. After the expiration date, the message will be discarded if it has not yet been delivered. Optionally, some messages can have no expiration date. In a preferred embodiment, there are three levels of priority, high, normal, and low, with normal being the default value. Generally, higher priority messages are delivered before lower priority messages. However, the priority can be treated as one factor, along with the expiration date, in determining which message to deliver. Some messages also may be marked as "always deliver," (field 106 in FIG. 2) indicating that it should be delivered before its expiration date, even if that would be sooner than provided by the pacing algorithm. For example, if messages are to be delivered no more than once every 7 days, and an "always deliver" message would expire 4 days after the last message was delivered, then it would be delivered after 4 days. Preferably, the 7 day period would be restarted after the "always deliver" message is sent. Optionally, messages can be marked as "urgent" (field 108) and delivered immediately, regardless of when the last message was delivered. An "urgent" message may or may not re-set the delivery timer.

According to one embodiment, pacing system 14 will accept each message it receives from each message source 12. Other than with "always deliver" or "urgent" messages, pacing system 14 then waits until n time units after it sent the last message to recipient 16. Pacing system 14 then considers all messages that have not been delivered and have not expired. The message properties are then used to select a message to deliver. For example, pacing system 14 could select the message with the shortest expiration date, using priority as a tie-breaker. Or, pacing system 14 could select the message with the highest priority, using expiration date as a tie-breaker.

Also, combinations of these and other properties of the message can be considered. For example, the recipient could designate certain senders as higher priority than other senders. In addition, pacing system 14 can treat message channels individually or in combinations. Thus, messages sent by e-mail may have no effect on the timing of telephone calls (and vice versa), messages sent by e-mail and telephone calls could be treated together for timing (that is, no call is made or e-mail sent until n days after the last call or e-mail), or some combination of these extremes could be used. For example, calls could be separated by at least 14 days and e-mails could be separated by at least 7 days, with the added requirements that an e-mail cannot be sent for at least 3 days after a call and a call cannot be made for at least 4 days after an e-mail. As another example, message timing can be based at least in part on categorized message types.

Figure 3:
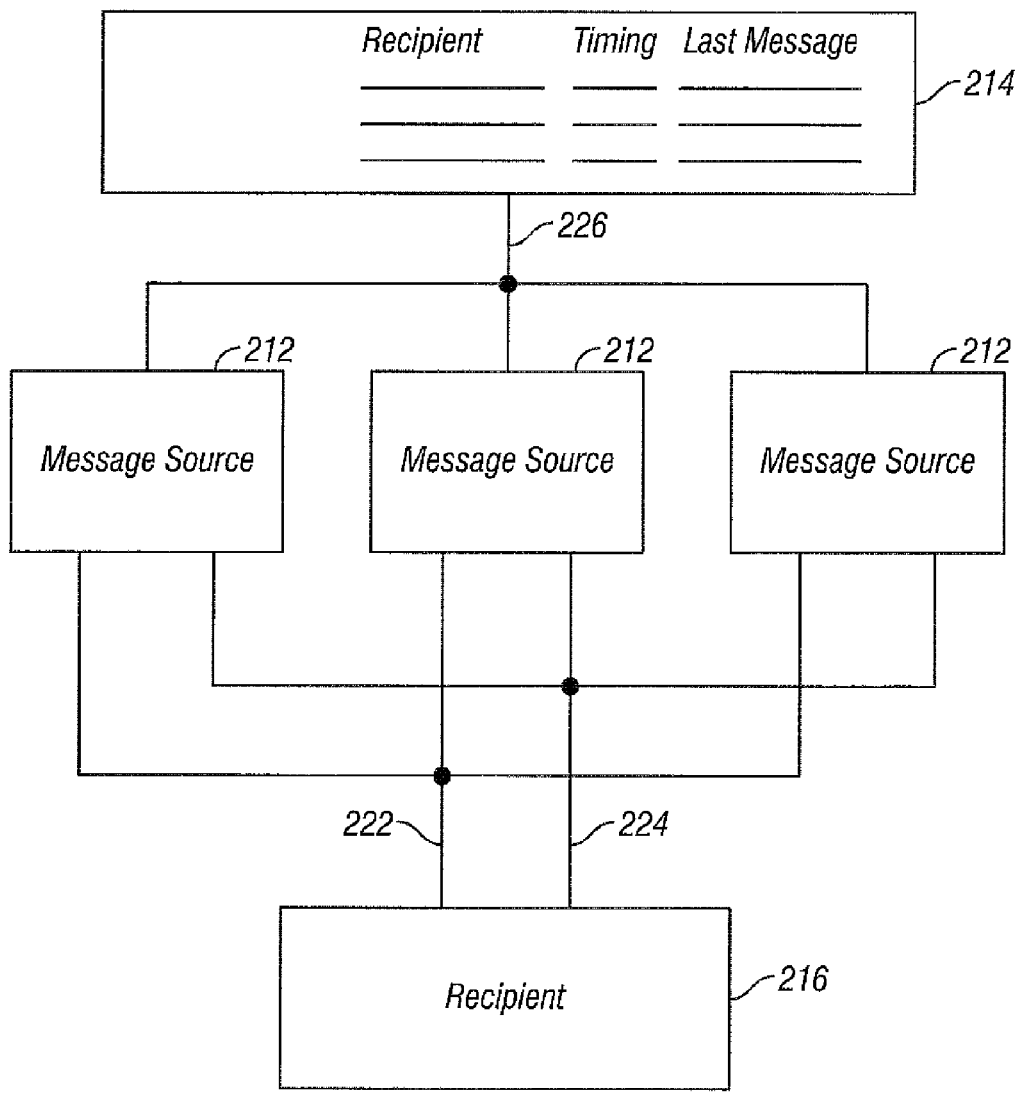
FIG. 3 is a block diagram of a system according to an embodiment of the present invention.

Instead of a centralized pacing system, a central pacing storage system 214 can be used, as shown in FIG. 3. In this embodiment, each message source 212 sends messages directly to recipient 216, through channel 222 or channel 224. For example, channel 222 could be an e-mail channel and channel 224 a phone channel. Although only two channels are shown, it is understood that more channels could be used. In addition, each message source 212 is connected to pacing storage system 214 over network 226. Of course, it is understood that network 226 and one of the channels (such as e-mail channel 222) could overlap (if, for example, both use the Internet). Pacing storage system 214 maintains for each recipient 216 message managing information, such as a record with the value of n (the timing between messages) and the date the last message was sent to that recipient. If the value of n is global for all recipients (or a group of recipients), then it is understood that its value may be maintained for each recipient without storing separate instances of the value for each recipient. Where appropriate, pacing storage system 214 may maintain records of the date the last message was sent on each channel or in each category.

When a message source 212 is ready to send a message to a particular recipient, the message source checks with pacing storage system 214 to determine when the last message was sent and the timing interval n. Or, message source 212 may make a request for whether a message can be sent to the recipient, in which case pacing storage system 214 would calculate whether the current date is greater than the date the last message was sent plus the timing interval, and respond to message source 212. If the new message can be-sent, message source 212 sends the message and informs pacing storage system 214, so that the date of the last message can be updated. If the current time is less than the timing interval since the last message was sent, then message source implements a pacing algorithm to determine when to try again. For example, the message source could wait until the end of the interval and then check again. Or, if this is an "always deliver" message, the message source would wait until the message is about to expire and then send the message.

The message gap can vary based on the priority of the message. For example, the message gap for a high priority message could be 3 days (that is, 3 days since the last contact of any priority), with the message gap for a normal priority message 7 days, and the message for a low priority message 14 days. Also, the message gap can vary based on the prior message. So, for example, a low priority message can be sent 7 days after a high or normal priority message, but not for 14 days after a low priority message.

In a preferred embodiment, pacing system 14 uses storage system 18 to keep track of the message gap or gaps (which can be a global value, or personalized for each recipient), and the following information for each recipient: $T_{last}$ (the date of the last contact, which could be never); $T_{next}$ (the earliest date at which the recipient can be contacted); and $S_{msgs}$ (the set of messages to be sent to the recipient). For each message, pacing system 14 records the arrival date, so that messages with the same priority and expiration date can be processed according to a "first-come, first-served" algorithm.

Figure 4:
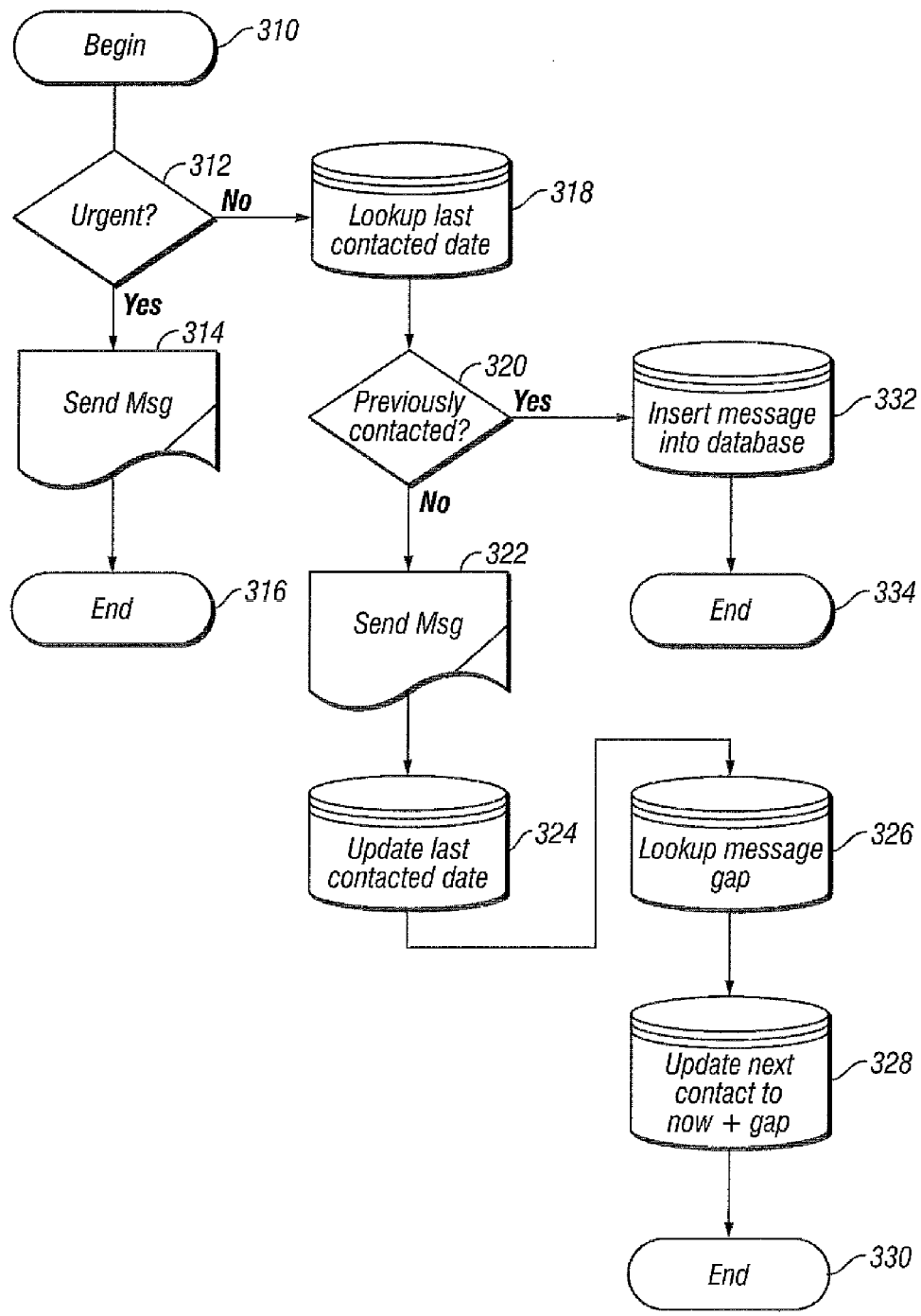
FIG. 4 is a flow diagram of steps performed according to an embodiment of the present invention.

One way for the pacing system to decide, as each new message arrives, whether it should be sent immediately or placed in the data store, is shown in FIG. 4. A message arrives at step 310. Pacing system 14 then determines (step 312) whether the message is marked "urgent." If so, the message is sent (step 314) and the process ends (step 316). It is assumed, with this example, that urgent messages do not cause the timer gap to be reset. If the message had not been marked urgent, the pacing system looks up the last contacted date ($T_{last}$), at step 318, and determines if the recipient had previously been contacted (step 320). If the recipient had not previously been contacted, the message is sent (step 322). The pacing system then updates the last contacted date (step 324), looks up the message gap (step 326), and updates the next contact date ($T_{last}$) at step 328. The process then ends (step 330). However, if the pacing system determines at step 320 that the recipient had been contacted, then the message is inserted into the database by updating $S_{msgs}$ (step 332). The process then ends (step 334). Alternatively, the lookup message gap and update next contact date steps (steps 326 and 328) can be performed if the recipient previously had been contacted. In this case, those steps preferably would be performed after inserting the message in the database at step 332. With this alternative, the pacing system would not "wake up" (as discussed below) unless a message is waiting in the database.

This process also can be implemented in a number of other ways. For example, the system could let the next contact date have a value of "immediately" when the last message gap has expired (or no messages previously have been sent), and use that value at step 318 (instead of the last contacted date) to determine whether a message should be sent. Similarly, the system could check whether the next contact date is prior to the current time. Or, a separate flag (such as a "window open" flag) could be tested at step 320 to determine whether a message can be sent immediately.

Using timers or periodic queries, pacing system 14 "wakes up" when the next contact date arrives. The pacing system then determines which message to send, then resets the message dates.

Figure 5:
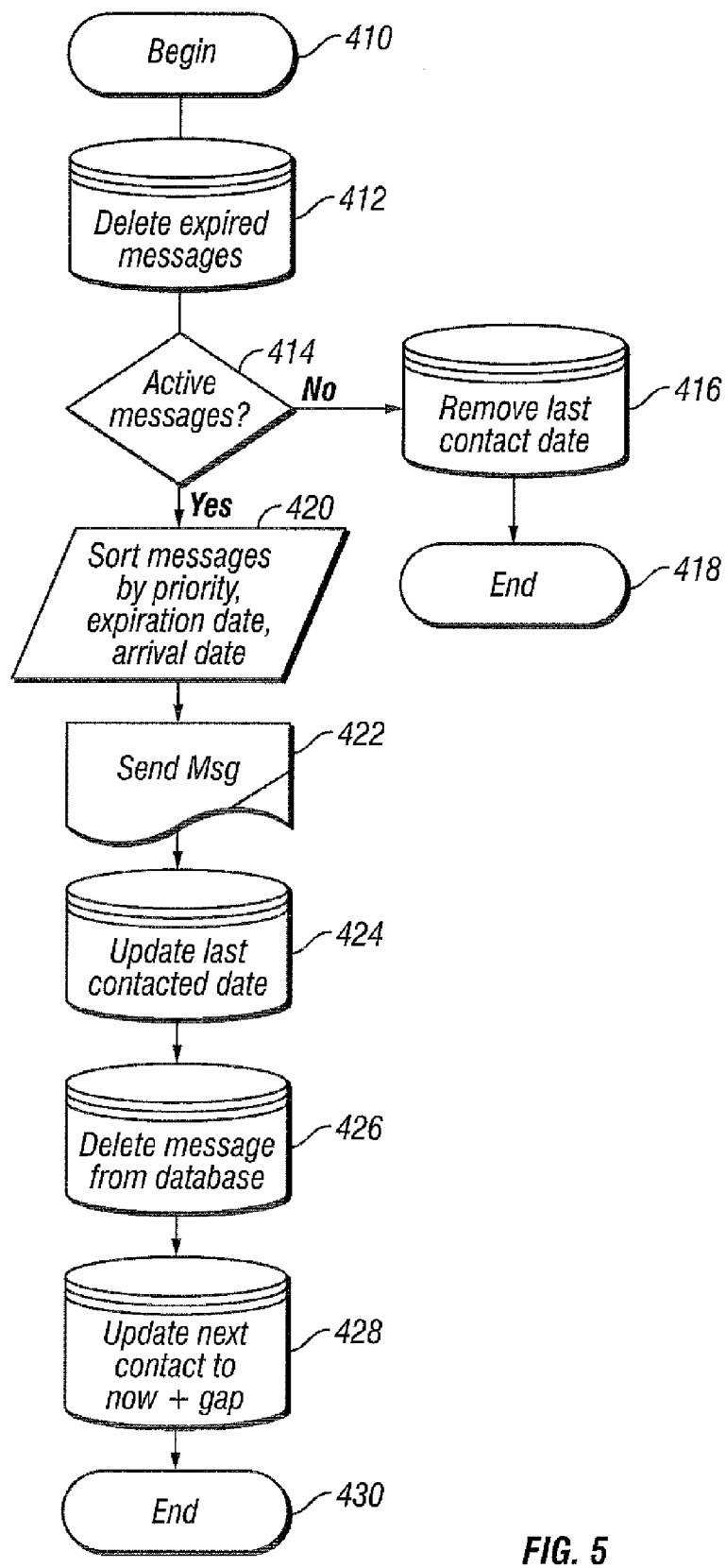
FIG. 5 is a flow diagram of steps performed according to an embodiment of the present invention.

One way to implement this process is shown in FIG. 5. At step 410 the process begins. The pacing system first deletes expired messages, at step 412. Then, the pacing determines whether any active messages remain (step 414). If not, then the system deletes the last contacted date (step 416), so that when a new message arrives it will be sent immediately. The process then ends (step 418). If, at step 414, the system determined that one or more active messages remained, the messages preferably are sorted by priority, expiration date, and arrival date (step 420). Alternatively, other selection processes can be used. After sorting the messages, the system sends the highest priority message (step 422). The system then updates the last contacted date $T_{last}$(step 424), deletes the sent message from the set $S_{msgs}$ (step 426), and updates the next contact date ($T_{next}$) at step 428. The process then ends (step 430). If, instead of checking (at step 320 of FIG. 4) the last contacted date, the system checks for whether the window is open, then step 416 could be omitted. Or, if at step 320 the system checks the next contact date for an "immediate" value or value in the past, then step 416 would be replaced with updating the next contact date to the immediate value, or omitted.

Alternatively, with either of the above systems, to select which message is sent (and when the message is sent) the system (the pacing system, where a centralized pacing system is used, or each message source where a centralized storage system is used) could assign delay times based on the message properties and a random number. In this alternative, the system sends messages during an open window period. The window is open if the last message was sent at least n time units previously, where n is the message gap. The message gap can be the same for all recipients or can vary by recipient. Otherwise, the window is closed and the message is delayed until a point in time shortly after the window is expected to open. If the window is still closed after the delay, the process repeats.

With the use of an open window period, because each message is processed individually, the length of each message delay is staggered, so that messages with a higher priority "wake up" before messages of lower priority. For messages with equal priority, the delay is adjusted so that those with shorter expiration dates wake up before messages with longer expiration dates. For messages with the same priority and expiration date, a random factor is used to ensure they do not wake up at the same time. In a system with a single engine or processor executing the programs for sending messages, it may also be the case that only one message is processed at a time, which will lead to one message being processed first, and the other message then waiting until the window re-opens. Preferably, the wake up time ($T_{wake}$) is determined using the following algorithm:

$T_{wake}=T_{open}$+[priority weight]+5 min*(20,num-_weeks[$T_{exp}-T_{open}$])+ran(0-5 min), where $T_{open}$ is the time that the window opens, calculated as:

$T_{open}$=(last contacted date+message gap).

and where $T_{exp}$ is the expiration time (that is, the expiration date of the message) and where [priority weight] is 0 hours for high priority messages, 2 hours for normal priority messages, and 4 hours for low priority messages. Alternatively, a simpler algorithm employing only some of these factors, could be used, or a different algorithm could be used. Also, the algorithm can consider the message channel as well (as discussed above), so that messages in one channel (such as e-mail) are considered independently of messages in another channel (such as phone calls or facsimiles), or so that prior messages in one channel affect when messages can be sent through another channel.

Figure 6:
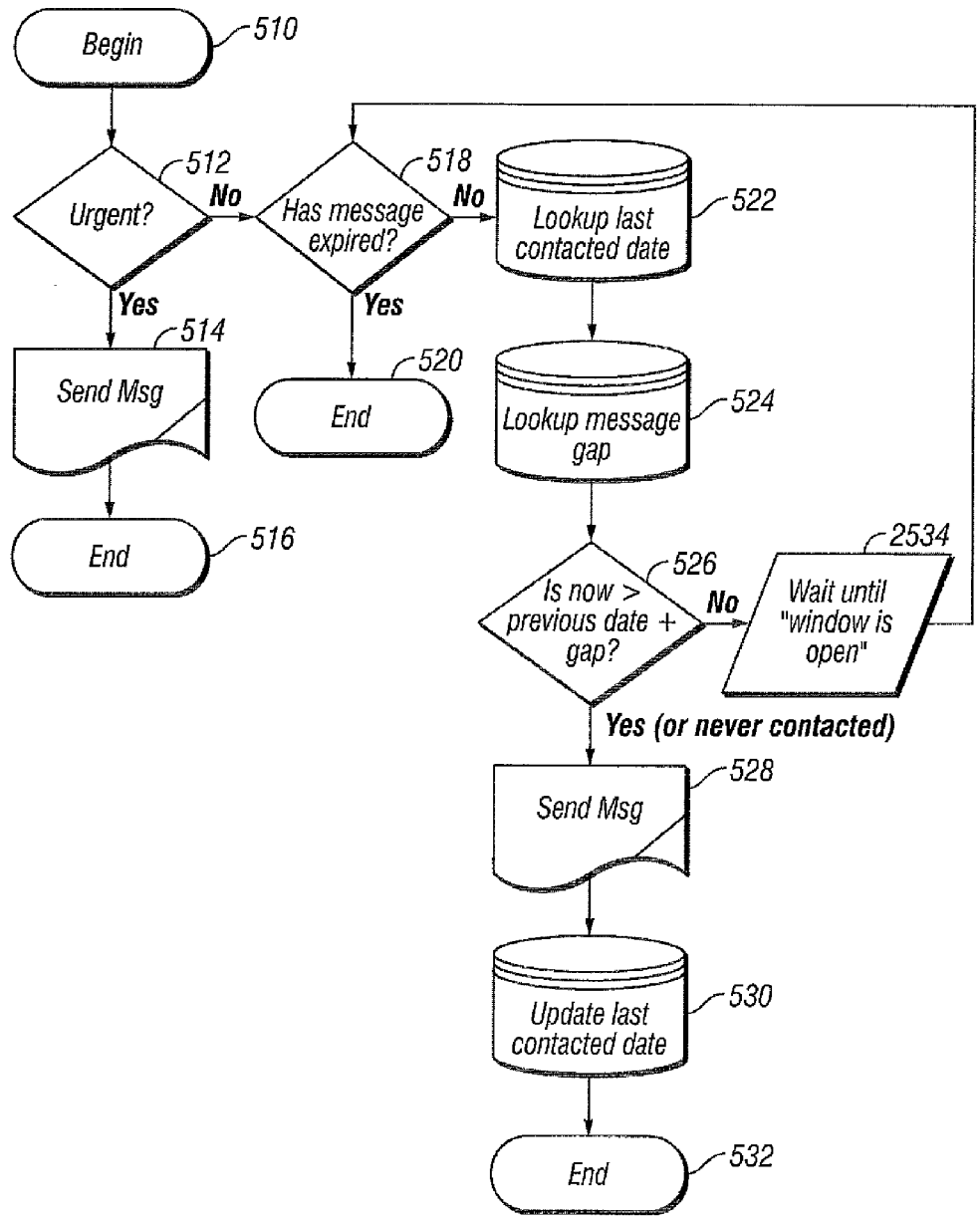
FIG. 6 is a flow diagram of steps performed according to an embodiment of the present invention.

One way to implement this selection process is shown in FIG. 6. The process begins at step 510, when a message arrives or a message wakes up. At step 512, the system determines if a message is marked "urgent." If it is, the message is sent (step 514) and the process ends (step 516). If, at step 512, the message had not been marked urgent, the system determines (step 518) if the message has expired. If so, the process ends (step 520). If not, the system looks up the last contacted date (step 522) and the message gap for this recipient (step 524). The system then checks (step 526) whether the current date is greater than the sum of the last contacted date plus the message gap. If so (or if the recipient had not previously been contacted), then the message is sent (step 528). The system then updates the last contacted date (step 530) and ends (step 532). If the current date was not greater than the sum of the last contacted date plus the message gap (that is, the window is closed), then the system waits (step 534) until the window opens, then returns to step 518. This ensures that the current message will be processed before another message that wakes up while the system waits. The window could be closed, for example, because another message had been sent since the wake-up time for that message had been calculated. Alternatively, if the window was closed, the message could go back to sleep for a specified time period and the process could end, which could mean that another message will be processed before it if the other message wakes up first.

In addition to determining the timing of messages, in a preferred embodiment the pacing system can be used to manage message volume. Message volume management mechanisms include aggregating messages, discarding similar messages, and stimulating messages. Thus, volume management can be used both to reduce and to increase the number of messages, depending on the message volume.

Figure 7:
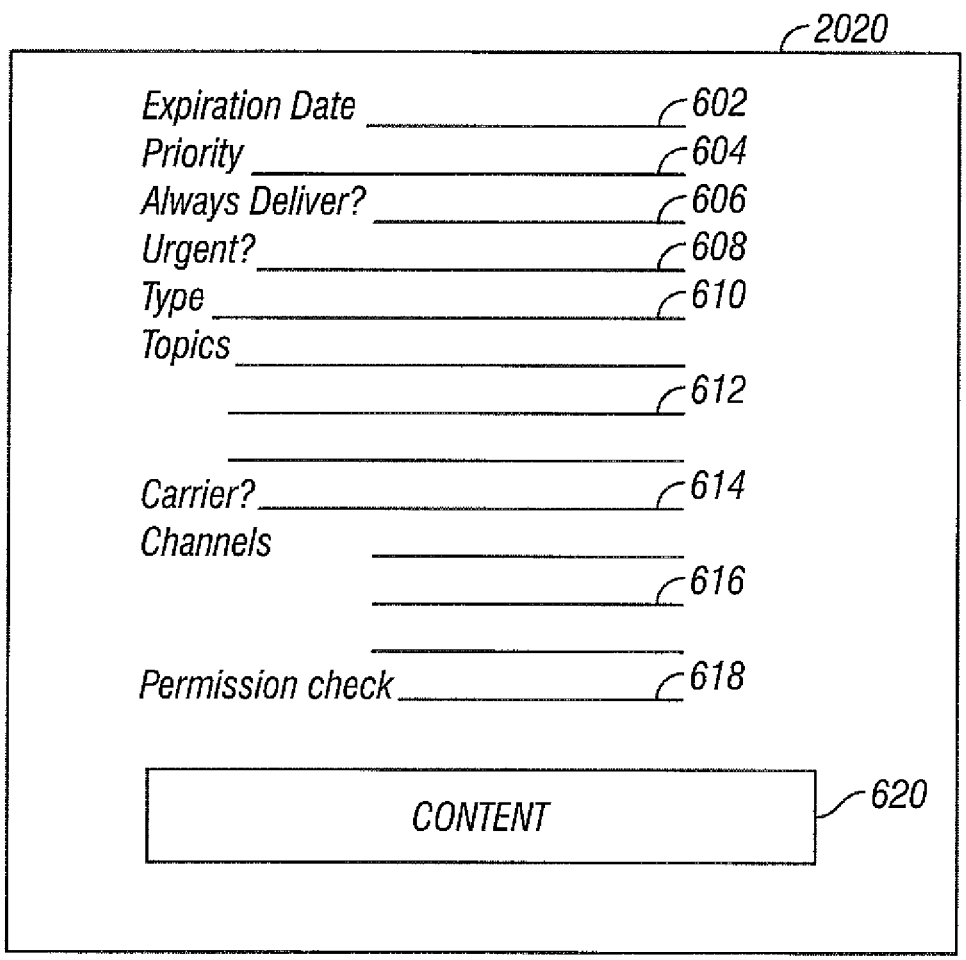
FIG. 7 is a representation of a structure for use with an embodiment of the present invention.

For aggregating messages, as shown in FIG. 7, messages can be assigned the additional properties of type 610 and topics 612. A message type indicates the kind of content contained in the message, such as informational, advertisement, or cross-sell. The message topics indicate the subjects that the message contains, such as the type of product to which an offer relates. The message topics also can refer to the source of a product or offer, where information or products from different sources may be offered.

The pacing system, in this example, still accepts messages from the message sources. Given a pool of messages, pacing system 14 can select a subset of the undelivered messages and combine them into a single message to be delivered at one time. To do this, pacing system 14 is configured with a set of rules and templates for combining messages. The rules could be, for example, "no more than two advertisements in a message," "at least one informational item in a message," and rules preventing certain message topics from being combined in a single message. For example, a rule might ensure that information about a new humidifier is not sent along with information about a new dehumidifier. These rules would work with the selection rule to determine which messages are combined into the single message. The templates describe how to format the messages. For example, informational items are placed on the left side and advertisements are placed on the right side, or two advertisements must be separated by some other type.

In addition, messages can be identified as carriers or tag-alongs (field 614 in FIG. 7). Tag-along messages are placed in a priority queue or queues. When a carrier message is about to be sent, the message source checks the tag-along queue(s) and selects one or more items to add to the carrier message in accordance with a set of rules. The rules could, for example, limit the number of tag-alongs per message or the types of tag-alongs that can be combined in a single message, and could prevent tag-along messages with certain topics from being combined with certain carrier messages or tag-along messages of specified types or topics. The templates, in this case, may describe how to format the carrier message relative to the tag-along messages, and the tag-along messages relative to each other.

Optionally, messages also can identify the channel or channels (field 616) over which a message can be sent. The channel identifier 616 may be used, for example, to determine which messages to aggregate, so that the pacing system will aggregate messages being sent over the same channel. Also, the channel identifier 616 can be used so that the pacing system can choose one of several channels to use for message delivery. This may apply, for example, to optimize aggregation or to minimize the delay before a message is sent to a particular recipient. In one embodiment, channel identifier 616 is used to determine the channel by which to send a message when the delay periods over different channels are different. Optionally, where multiple channels are identified, other fields (such as priority field 604) can have an entry for each channel.

Where recipients have the ability to "opt-out" of receiving certain messages or it may otherwise be determined that a message should not be sent to a recipient during the delay period before a message is forwarded to the recipient, messages also may be assigned a permission check property 618. Permission check property 618 can be used, similarly to expiration date property 602, to determine when a message should not be sent. For example, in a centralized pacing system, if permission check property 618 is true, the pacing system checks whether a participant has opted out of a message before sending the message on to the recipient.

For discarding similar messages, the pacing system can apply a set of precedence rules. For example, the pacing system can have a rule that a message is discarded if another message of the same or a similar type (or on the same or a similar topic) was delivered within a particular time period. Alternatively, this type of rule could be used to delay a message, so that two messages of the same or similar types (or topics) are not sent within a specified time period.

While the preceding volume management functions reduce the volume of messages (or the volume of similar messages), it may also be desirable to stimulate the sending of messages when a specified time frame has elapsed without any messages being sent. Thus, in addition to storing a minimum period between messages, the pacing system can store an upper threshold period. If the upper threshold period is exceeded without a message being sent, the pacing system can notify the message sources.

Although some of the message volume management functions have been described in terms of a central pacing system and some in terms of a pacing storage system, it should be understood that the functions could be implemented with either type of system or a combination of the two.

While there have been shown and described examples of the present invention, it will be readily apparent to those skilled in the art that various changes and modifications may be made therein without departing from the scope of the invention as defined by the following claims. For example, the invention can be implemented with a push system, a pull system, an inbox or outbox system, or any other message delivery system. Also, timing periods could be adjusted so that, for example, all e-mails are sent on a particular day of the week or month, or low priority messages are sent only on a particular day. Furthermore, some functions of a central pacing system can be combined with some functions of a pacing storage system (allowing, for example, some messages to be sent directly from the message sources to the recipients) as part of an overall pacing system. Moreover, while some message delivery functions or properties have been described in terms of global properties and some in terms of personal properties, the delivery algorithms can apply the rules globally, at an individual level, or at a group level as desired. Accordingly, the invention is limited only by the following claims and equivalents thereto.

What is claimed is:

1. A system for managing electronic messages comprising:
   an electronic message source comprising an e-mail server;
   a data storage system for storing message management information, the message management information comprising last contact information for a recipient indicating when the recipient was last contacted and a message gap; and
   a pacing system coupled to the electronic message source;
   the electronic message source configured to:
      send a request to the pacing system to check whether the electronic message source can send a new e-mail to a recipient based on the message management information;
      if the new e-mail can be sent to the recipient based on the checking, send the new e-mail to the recipient and inform the pacing system that the new e-mail has been sent;
      if the new e-mail is not sent based on the checking, implement a pacing routine to determine when to try again;
   the pacing system configured to:
      receive the request from the electronic message source;
      determine whether the new e-mail should be sent to the recipient based on the last contact information for the recipient and the message gap;

return a result of the determining to the electronic message source; and update the last contact information for the recipient in response to an indication from the electronic message source that the new e-mail was sent.

2. The system of claim 1, wherein the message gap corresponds to a priority of the new e-mail.

3. The system of claim 1, wherein the message gap is global for a set of recipients.

4. The system of claim 1, wherein the message gap is personalized for the recipient.

5. The system of claim 1, wherein the pacing system is further configured to determine whether the new e-mail should be sent to the recipient based on a message priority of the new e-mail.

6. A system for managing electronic message delivery comprising:
an electronic message source comprising an e-mail server;
a data storage system for storing message management information, the message management information comprising last contact information for a recipient indicating when the recipient was last contacted and a message gap; and
a pacing system coupled to the electronic message source;
the electronic message source configured to:
send a request to the pacing system for the last contact information and message gap;
receive the last contact information and message gap from the pacing system;
determine whether a new e-mail should be sent to the recipient based on the last contact information for the recipient and the message gap;
if the new e-mail can be sent to the recipient based on the checking, send the new e-mail to the recipient and inform the pacing system that the new e-mail has been sent;
if the new e-mail is not sent based on the checking, implement a pacing routine to determine when to try again;
the pacing system configured to:
receive the request from the electronic message source;
return the last contact information and message gap to the electronic message source; and
update the last contact information for the recipient in response to an indication from the electronic message source that the new e-mail was sent.

7. The system of claim 6, wherein the message gap corresponds to a priority of the new e-mail.

8. The system of claim 6, wherein the message gap is global for a set of recipients.

9. The system of claim 6, wherein the message gap is personalized for the recipient.

10. The system of claim 6, wherein the electronic message source is further configured to determine whether the new e-mail should be sent to the recipient based on a message priority of the new e-mail.

11. A system for managing electronic message delivery comprising:
a data storage system for storing message management information, the message management information comprising message timing information; and
a pacing system coupled to the data storage system and coupled to one or more message sources over one or more electronic communication paths, the pacing system comprising a processor and a tangible, non-transitory computer readable storage medium accessible by the processor storing computer executable instructions, the pacing system configured to:
receive electronic messages from the one or more message sources, each electronic message including a corresponding recipient address and content to be delivered; and
store message timing information and messages to be sent to recipients;
when a new electronic message arrives for a recipient:
determine if the new electronic message should be delivered immediately and, if so, send the new electronic message as an e-mail to an email address for the recipient;
otherwise add the new electronic message to a set of electronic messages to be sent to that recipient; and
send electronic messages to the recipient from the set of electronic messages as e-mails based on the message management information such that a second electronic message sent to the recipient is spaced from a first electronic message sent to the recipient.

12. The system of claim 11, wherein the first electronic message is the new electronic message.

13. The system of claim 11, wherein the message timing information comprises a message gap.

14. The system of claim 13, wherein the message gap is global for a set of recipients.

15. The system of claim 13, wherein an individual message gap is maintained for each recipient.

16. The system of claim 13, wherein the message management information comprises a last contact time for the recipient and a next contact time for the recipient.

17. The system of claim 16, wherein the pacing system is configured to record an arrival time for each message stored in the set of electronic messages.

18. The system of claim 16, wherein the pacing system is configured to:
determine if the new electronic message should be delivered immediately based on a message priority;
if the message priority indicates immediate delivery, send the new electronic message to the recipient;
if the message priority does not indicate immediate delivery:
determine the last contact time for the recipient;
if the recipient had not previously been contacted:
send the new electronic message to the recipient; and
update the next contact time for the recipient; and
otherwise, add the new electronic message to the set of electronic messages to be sent to the recipient.

19. The system of claim 16, wherein the pacing system is configured to:
determine an opening time for a message window, the opening time being at least on a last contact time for the recipient plus the message gap;
determine a wakeup time each electronic message in the set of electronic messages, the wakeup time for each electronic message in the set of electronic messages based on at least the opening time for the message window and a priority for that electronic message; and
select as the second electronic message an electronic message in the set of electronic messages with a lowest wakeup time.

20. The system of claim 11, wherein the pacing system is configured to select a subset of electronic messages from the set electronic messages and combine them into a single message to be delivered as the second message.

* * * * *